R. F. Norwood,
Cotton Planter.
No. 112,171. Patented Feb. 28, 1871.

United States Patent Office.

RUFUS F. NORWOOD, OF CHARLOTTE, NORTH CAROLINA.

Letters Patent No. 112,171, dated February 28, 1871.

IMPROVEMENT IN COTTON-PLANTERS.

The Schedule referred to in these Letters Patent and making part of the same.

*To all whom it may concern:*

Be it known that I, RUFUS F. NORWOOD, of Charlotte, in the county of Mecklenburgh and State of North Carolina, have invented a new and improved Cotton-Planter; and I do hereby declare that the following is a full, clear, and exact description thereof, which will enable others skilled in the art to make and use the same, reference being had to the accompanying drawing forming part of this specification.

This invention relates to improvements in feed apparatus for dropping cotton-seed, fertilizers, and the like; and It consists in a grooved revolving cylinder arranged in the bottom of the hopper to receive the seed in the grooves through a pair of vibrating gates above, operated by the attendant, and a spring cutting-off gate, which prevents the discharge from more than one of the grooves at once, said spring being pushed back to open the passage for the seed by pins projecting from the roller, and the latter being turned by connection with the wheel on which the machine is mounted, all as hereinafter described.

Similar letters of reference indicate corresponding parts.

Figure 1:
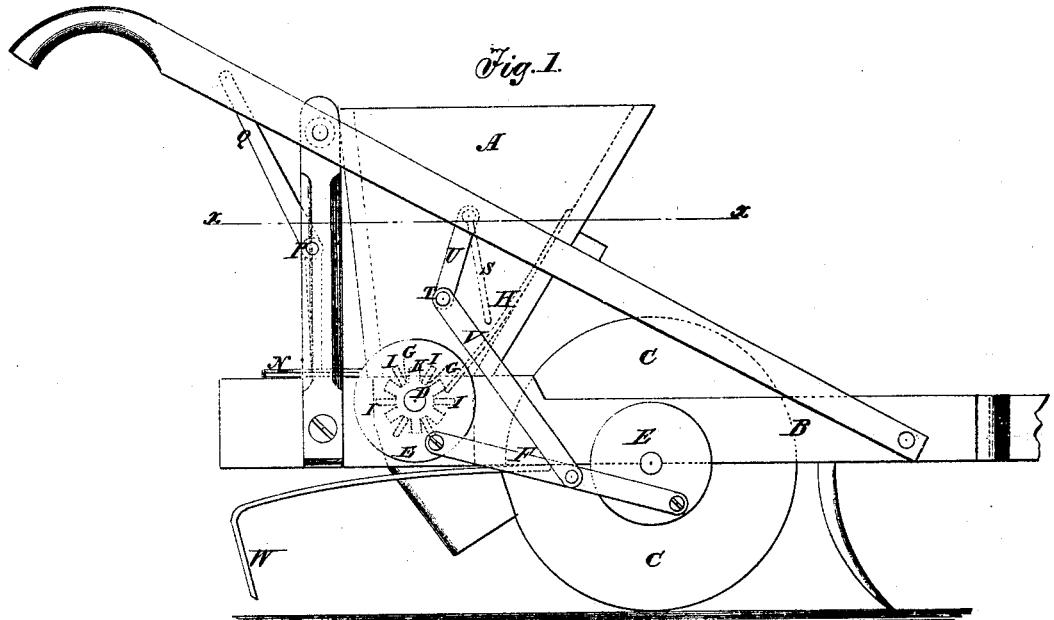
Figure 1 is a side elevation of my improved machine.
Figure 2:
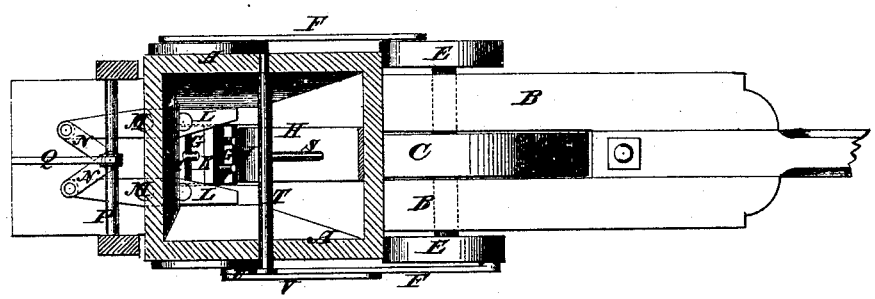
Figure 2 is a horizontal section of the same.

A is the hopper, which may be mounted on any suitable truck-frame, B, and supporting-wheel C.

D is the roller, mounted at the bottom of the hopper transversely of the frame, and connected with the disks E, on the shaft of wheel C, by rods, F, for turning it.

This roller is provided with deep longitudinal grooves, G, to serve as pockets for the reception of the seed, and carry it around past the spring gate H to drop it.

I represents pins projecting from the grooves at the bottom beyond the periphery of the cylinder, to spring the gate H away from the periphery at the proper time for the discharge of the seed; and as soon as they pass beyond the end of the said gate, just previous to the dropping of the seed, the gate goes back and against the periphery of the dividing-wall R, between the pocket discharged and the next one, ready for the next operation.

Above the cylinder is a pair of vibrating gates, L, pivoted at M, to open and close over the roller, and connected by links, N, with the vibrating arms of a rocker-shaft, P, on which is a lever, Q, which is worked by the attendant.

S represents an agitating-arm, projecting downward from the rock-shaft T, traversing the hopper, and connected to one of the connecting-rods F by a crank, U, and rod V, so that the said arm is vibrated so as to prevent clogging.

W represents the covering-scrapers.

Having thus described my invention,

I claim as new and desire to secure by Letters Patent—

1. The combination, with the hopper A, of the grooved and toothed roller K, spring gate H, and the gates L, substantially as specified.

2. The spring cutting-off gate H, combined, as described, with pins I projecting from the grooves of the roller D, for the purpose specified.

RUFUS F. NORWOOD.

Witnesses:
T. H. BREIN,
W. B. GRIFFITH.